US012760191B2

(12) United States Patent
Majewski et al.

(10) Patent No.: US 12,760,191 B2
(45) Date of Patent: Oct. 13, 2026

(54) INKJET INK COMPOSITIONS

(71) Applicant: VIDEOJET TECHNOLOGIES INC., Wood Dale, IL (US)

(72) Inventors: David Majewski, Wood Dale, IL (US); Zheng Xue, Wood Dale, IL (US); Linfang Zhu, Wood Dale, IL (US); John Folkers, Wood Dale, IL (US); Hanyan Meng, Wood Dale, IL (US)

( * ) Notice: Subject to any disclaimer, the term of this patent is extended or adjusted under 35 U.S.C. 154(b) by 325 days.

(21) Appl. No.: 18/388,605

(22) Filed: Nov. 10, 2023

(65) Prior Publication Data

US 2024/0076511 A1 Mar. 7, 2024

Related U.S. Application Data

(63) Continuation of application No. PCT/US2022/028302, filed on May 9, 2022.

(60) Provisional application No. 63/243,905, filed on Sep. 14, 2021, provisional application No. 63/188,186, filed on May 13, 2021.

(51) Int. Cl.

| | |
|---|---|
| ***C09D 11/033*** | (2014.01) |
| ***C09D 11/107*** | (2014.01) |
| ***C09D 11/14*** | (2006.01) |
| ***C09D 11/328*** | (2014.01) |
| ***C09D 11/36*** | (2014.01) |
| ***C09D 11/52*** | (2014.01) |

(52) U.S. Cl.

CPC .......... *C09D 11/033* (2013.01); *C09D 11/107* (2013.01); *C09D 11/14* (2013.01); *C09D 11/328* (2013.01); *C09D 11/36* (2013.01); *C09D 11/52* (2013.01)

(58) Field of Classification Search

CPC ..... C09D 11/033; C09D 11/107; C09D 11/14; C09D 11/328; C09D 11/36; C09D 11/52

See application file for complete search history.

(56) References Cited

U.S. PATENT DOCUMENTS

| | | | | |
|---|---|---|---|---|
| 4,680,058 | A | 7/1987 | Shimizu et al. | |
| 7,125,447 | B2 | 10/2006 | Sugita et al. | |
| 7,147,699 | B2 | 12/2006 | Moore et al. | |
| 7,993,440 | B2 | 8/2011 | Shikata et al. | |
| 2012/0026257 | A1* | 2/2012 | Robertson .............. | C09D 11/32 524/106 |

(Continued)

FOREIGN PATENT DOCUMENTS

| | | |
|---|---|---|
| CN | 104231746 | 12/2014 |
| EP | 1 193 300 | 4/2002 |

(Continued)

OTHER PUBLICATIONS

Extended European Search Report dated Feb. 21, 2025.
International Search Report and Written Opinion for PCT Application No. PCT/US2022/028302 dated Aug. 1, 2022.

*Primary Examiner* — Yaovi M Ameh
(74) *Attorney, Agent, or Firm* — Foley & Lardner LLP

(57) ABSTRACT

The present invention relates to inkjet ink compositions that take advantage of solvent mixtures containing an ester, a ketone, and optionally an alcohol, in order to provide ink compositions that have suitable qualities for inkjet printing. Preferred ink compositions include a C1-C3 alkyl ester of C1-C3 carboxylic acid, a C3-C7 ketone, and optionally a C2-C3 alkyl alcohol.

20 Claims, 2 Drawing Sheets

(56) References Cited

U.S. PATENT DOCUMENTS

| | | | | |
|---|---|---|---|---|
| 2020/0332136 | A1* | 10/2020 | Weng | B41J 2/2107 |
| 2021/0040337 | A1 | 2/2021 | Kinjoh et al. | |

FOREIGN PATENT DOCUMENTS

| | | | | |
|---|---|---|---|---|
| EP | 3 838 996 | | 6/2021 | |
| JP | 2002529572 | A5 * | 12/2006 | C09D 11/00 |

* cited by examiner

INKJET INK COMPOSITIONS

CROSS-REFERENCE TO RELATED PATENT APPLICATIONS

This application is a continuation of PCT Application No. PCT/US2022/028302, filed May 9, 2022, which claims the benefit of and priority to U.S. Provisional Patent Application No. 63/243,905 filed Sep. 14, 2021 and U.S. Provisional Patent Application No. 63/188,186 filed May 13, 2021, all of which are incorporated herein by reference in their entireties.

BACKGROUND

1. Field of the Invention

The invention relates to the field of ink compositions suitable for inkjet printing. Preferably, the compositions are suitable for continuous inkjet printing. These compositions contain solvent mixtures or blends of three or more solvents, where preferred solvent mixtures do not contain the commonly used solvent methyl ethyl ketone (MEK).

2. Background of the Invention

In ink jet printing, printing is accomplished without contact between the printing device and the substrate on which the printed characters are deposited. Briefly, inkjet printing involves projecting a stream of ink droplets to a surface and controlling the direction of the stream, e.g., electronically, so that the droplets are caused to form the desired printed image on that surface. This technique of noncontact printing is well suited for application of characters onto a variety of surfaces including porous and non-porous surfaces.

In general, an inkjet ink composition should meet certain requirements to be useful in inkjet printing operations. These relate to viscosity, resistivity, solubility, compatibility of components, and wettability for the substrate. Further, the ink should be quick-drying and smear-resistant, should be capable of passing through the inkjet nozzle without clogging, and should permit rapid cleanup of the machine components with minimum effort. In addition, the jet ink composition should provide printed images that adhere well to the substrates, particularly non-porous substrates.

Methyl ethyl ketone (MEK) is used as the main or the sole solvent in many continuous inkjet (CIJ) ink products. MEK, when used as the primary solvent in continuous inkjet inks, has many desirable properties. For example, MEK has the advantages of exhibiting a high evaporation rate for fast ink drying, good solvency for the binder resins and colorants commonly used in inks, in-printer stability, low cost, worldwide availability and good conductivity in the presence of conductive agents. However, MEK is increasingly being regulated as a "precursor." In many countries, MEK is included on the list of chemicals that may be used to manufacture illicit drugs, for example due to its potential role in the process of extracting cocaine from coca base/paste. Being so classified, any inks which use precursor chemicals are automatically subject to increased regulations and potential monetary burdens. In addition, MEK and methanol are on the Japan ISHL Class 2 Organic Solvent List and are not permitted above 5% by weight in Japan. Therefore, attempts have been made to develop inks based on solvents other than MEK due to their health and safety concerns, regulations such as VOC (volatile organic compounds) and HAP (hazardous air pollutants) and the like. MEK is regulated under VOC regulations in the U.S. Methanol is regulated as HAP. Thus, manufacture of such ink compositions that contain MEK poses potential risks should any regulatory limitations be imposed on MEK.

Some MEK-free inks have been produced, including, for example, Videojet™ products V469 (acetone/ethanol), V460 (ethanol), V461 (ethyl acetate/ethanol), V462 (isopropyl acetate/ethanol), V463 (MIPK), and V457 (MIPK). Inks with significant percentage of ethanol, however, suffer from printer reliability issues due to water absorption in the ink and require an air drier in many applications. In addition, ethanol and ester solvents such as ethyl acetate and propyl acetate/isopropyl acetate are not particularly good solvents for many of the resins and dyes used in continuous inkjet ink formulations. The ethanol and ester solvents also make it difficult to produce inks with the necessary conductivity for continuous inkjet inks from the conductive metal complex dyes often used in CIJ formulations. Acetone suffers from extremely high volatility, making inks that contain significant amount of acetone less reliable in hot environments. Solvents such as MIPK and MPK have the disadvantage of higher costs.

Therefore, there is a need in the art for good quality inkjet ink compositions that use less MEK or avoid its use altogether.

SUMMARY OF THE INVENTION

Therefore, the specification now discloses ink compositions with good properties for continuous inkjet printing, but which do not use MEK as the main solvent. The invention relates to an inkjet ink composition that is suitable for inkjet printing, preferably for continuous inkjet printing, and contains a solvent mixture with properties similar to MEK-based compositions. The ester/alcohol/ketone ternary mixtures described here are preferred because they are able to strike a balance among the factors discussed above and can overcome many of the disadvantages of the previous non-MEK inks.

Therefore, the present invention provides embodiments including an inkjet ink composition comprising (a) a binder resin; (b) a colorant; and (c) a solvent mixture containing (1) a C1-C3 alkyl ester of C1-C3 carboxylic acid; (2) a C3-C7 ketone; and (3) optionally a C2-C3 alkyl alcohol. In a preferred embodiment, the inkjet ink composition does not contain methyl ethyl ketone. In embodiments, the C1-C3 alkyl ester of C1-C3 carboxylic acid is a C1-C3 alkyl ester of C2-C3 carboxylic acid or is a C2-C3 alkyl ester of C1-C3 carboxylic acid.

Certain preferred embodiments include inkjet ink compositions wherein the C1-C3 alkyl ester of C1-C3 carboxylic acid is from about 10% to about 65% by weight of the ink composition, preferably from about 10% to about 60% by weight of the ink composition.

In preferred embodiments, the C2-C3 alkyl alcohol if present is from about 1% to about 60% by weight of the ink composition, more preferably about 1% to about 40% by weight of the ink composition, the C3-C7 ketone is from about 5% to about 60% by weight of the ink composition, more preferably from about 5% to about 50% by weight of the ink composition, and the C1-C3 alkyl esters of C1-C3 carboxylic acid is selected from the group consisting of methyl acetate (MeOAc), ethyl acetate (EtOAc), isopropyl acetate (iPrOAc), and n-propyl acetate (nPrOAc). In further preferred embodiments, the C2-C3 alkyl alcohol if present is from about 10% to about 60% by weight of the ink composition, more preferably from about 10% to about 40% by weight of the ink composition.

In preferred embodiments, the C1-C3 alkyl ester of C1-C3 carboxylic acid is selected from the group consisting of EtOAc and iPiOAc, the C2-C3 alkyl alcohol is selected from the group consisting of ethanol (EtOH), n-propanol (nPrOH) and isopropanol (iPrOH), and the C3-C7 ketone is selected from the group consisting of acetone, methyl ethyl ketone (MEK), diethyl ketone (DEK), methyl isopropyl ketone (MIPK), methyl n-propyl ketone (MPK), methyl isobutyl ketone (MIBK), methyl n-amyl ketone (MAK), methyl isoamyl ketone (MIAK), cyclopentanone, and cyclohexanone. More preferably, the C3-C7 ketone is selected from the group consisting of acetone, DEK, MIPK, and MPK.

In certain preferred embodiments, if water is present in the composition, it is present at less than 5% by weight of the ink composition.

In some embodiments, the binder resin is present in the inkjet ink compositions at from about 1% to about 25% by weight of the ink composition. Preferably, the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins.

In some embodiments, the colorant is present in the inkjet ink compositions at from about 1% to about 15% by weight of the ink composition. In some embodiments the colorant is a conductive solvent soluble dye, or a mixture of conductive solvent soluble dyes. In some embodiments the colorant is selected from C.I. Solvent Black 29, C.I. Solvent Black 27, C.I. Solvent Red 122, and combinations thereof.

In some embodiments, the calculated evaporation rate for the solvent mixture used in the inkjet ink composition is between about 2.0 and 4.0 based on individual published empirical values relative to n-butyl acetate. In some embodiments, the dry time of a printed mark on nonporous material is less than 5 seconds.

Preferably, the inkjet ink compositions according to the embodiments of the invention are formulated for continuous inkjet printing.

In some embodiments, the resistivity of the inkjet ink composition is 1800 Ohm-cm or lower at 25° C. In some embodiments, the evaporation rate of the ink composition is no more than 30 mg per minute.

A preferred embodiments, the invention provides an inkjet ink composition comprising (a) a binder resin; (b) a colorant; and (c) a solvent mixture containing (1) EtOAc or iPrOAc; (2) acetone, DEK, MIPK, or MPK, and (3) optionally EtOH, nPrOH, or iPrOH, wherein the ink composition does not contain detectable MEK.

DETAILED DESCRIPTION

1. Definitions

Figure 1:
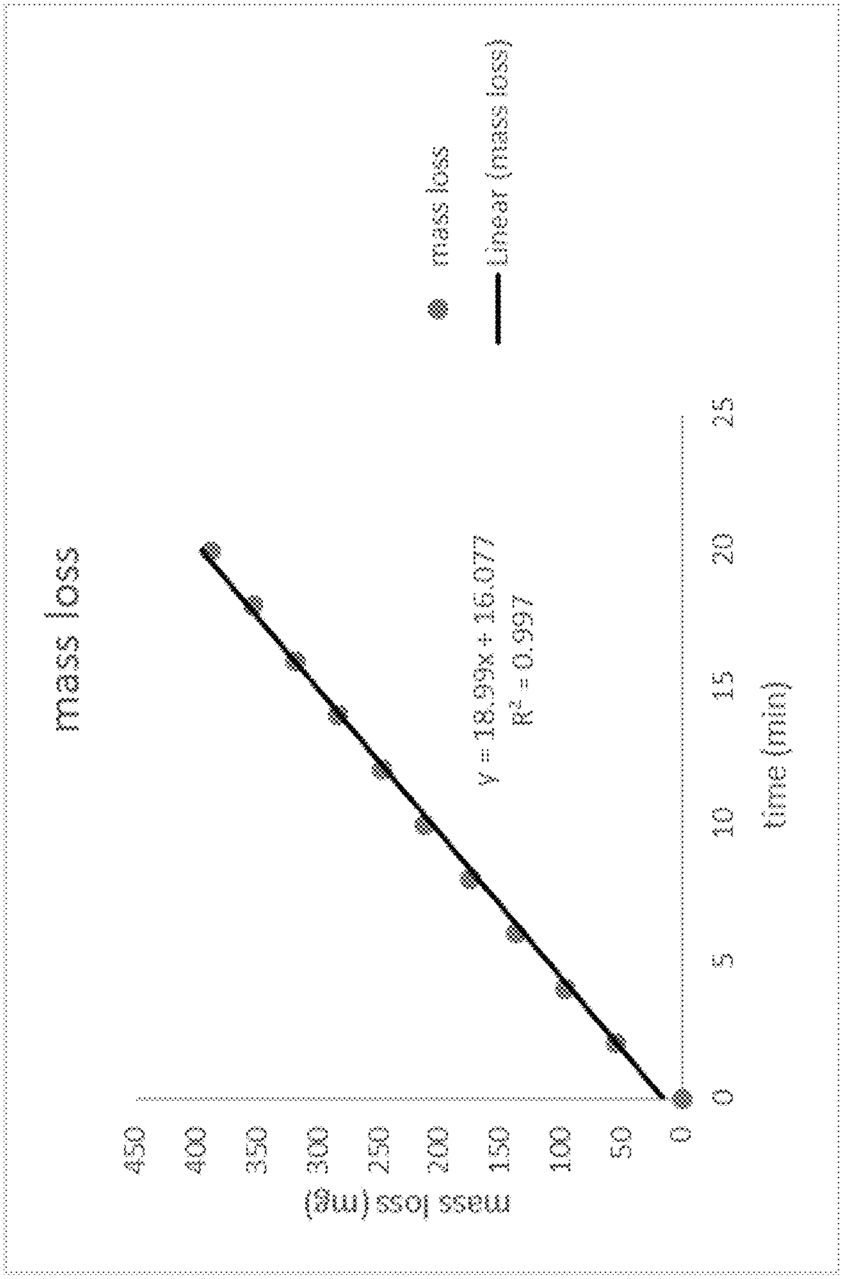
FIG. 1. shows the empirical evaporation rate for an MEK-based ink.

Unless defined otherwise, all technical and scientific terms used herein have the same meaning as commonly understood by one of ordinary skill in the art. Although various methods and materials similar or equivalent to those described herein can be used in the practice or testing of the present invention, suitable methods and materials are described below. However, the skilled artisan understands that the methods and materials used and described are examples and may not be the only ones suitable for use in the invention. Moreover, as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary.

As used herein, the term "about," as used herein, means plus or minus 20 percent of the recited value, so that, for example, "about 0.125" means 0.125±0.025, and "about 1.0" means 1.0±0.2.

As used herein, the term "ink" refers to a fluid or viscous substance used for writing or printing. The inks useful in the invention here are those suitable for use in continuous inkjet printing or other printing methodologies.

As used herein, the term "inkjet" and "ink jet" refer to inkjet printing, a type of printing that creates an image by propelling small droplets of ink onto a substrate such as paper, plastic, metal, glass, and the like. "Continuous inkjet" or "CIJ" methods are used, for example, in the marking and coding of products and packages. In this method, a pump directs a liquid ink composition from a reservoir to a nozzle to create a continuous stream of ink droplets. An electrode is placed in the path of the jet where the drop breaks off from the jet. A voltage is applied to the charge electrode which induces an opposite electrostatic charge to the surface of the conductive ink drop when the drop breaks off. The voltage from the electrode is controlled and variable to impart a controlled and variable amount of charge to the drop. The charged droplets are deflected to the proper location by passing through an electrostatic field to print the desired pattern on a substrate, or are recycled back to the reservoir for future use.

As used herein, the term "solvent" refers to an organic liquid or other component whose primary function is to dissolve and carry the other components of the ink composition. A "solvent mixture" or a "solvent blend" refers to a combination of different solvents.

As used herein, the term "resin," as used herein, generally refers to a substance that aids in making an ink composition adhere to the substrate to which it is applied during printing. In most cases, a resin is a polymeric material that holds other materials together to form a cohesive whole or to impart adhesive properties, particularly onto nonporous or semiporous substrates.

As used herein, the term "colorant," as used herein, refers to a dye, pigment or other substance that imparts color or modifies the hue of something else, and can refer to any such substance. Colorants include black dyes as well as other colors, and in some embodiments can be food grade, cosmetic grade or pharmacopeia grade colorants.

As used herein, the term "surfactant" refers to a substance that reduces the surface tension of a liquid in which it is dissolved.

As used herein, the term "conductive agent" refers to a reagent that enables the ink composition to exhibit electrical conductivity suitable for continuous inkjet printing, including ionic species such as organic and inorganic salts and in some cases the colorants used in the ink.

As used herein, the term "substrate" refers to a substance on which a mark is printed. Substrates can include, but are not limited to plastic, glass, metal and metal alloys, wood, paper, leather, and the like.

As used herein, the "resistivity" refers to the specific electrical resistivity expressed in Ohms-cm. Resistivity (R) is the reciprocal of conductivity (C). Conductivity of an ink can be expressed as Siemen/cm in which case the relationship is R*C=1 or more typically in micro-Siemen (μS)/cm. When expressed in μS/cm, resistivity and conductivity have the relationship of R*C=1,000,000.

As used herein, the term "volatility" describes how easily a substance vaporizes (turn into a gas or vapor). A volatile substance therefore is a substance that evaporates readily at normal temperatures.

As used herein, the term "relative evaporation rate" refers to the rate at which a material will vaporize (evaporate, change from liquid to vapor) compared to the rate of vaporization of a specific known material, generally n-butyl acetate under the same conditions. "Calculated evaporation rate" refers to the evaporation rate of a solvent or solvent mixture based on the known evaporation rates of the individual components of the mixture and their concentrations in the mixture. The term "empirical evaporation rate" refers to evaporation rates that have been measured experimentally. See methods below.

2. Embodiments of the Invention

Inkjet ink compositions containing solvent or combination of solvents that reduce the need to rely on MEK as a solvent, has been produced and is described herein. Solvents useful for inkjet ink compositions should have the qualities of a fast drying time, good solubility for the other ink components, and provides sufficient conductivity to the ink composition in the presence of suitable conductive agent such as a metal complex dye.

Widely available solvents with fast drying times include alkyl esters. For example, ethyl acetate has an evaporation rate comparable to that of MEK and is a good solvent for many types of polymeric resins. However, ethyl acetate has not been extensively used as the primary solvent for continuous inkjet inks, largely due to its poor solvency for commonly used dyes and low conductivity of resulting ink compositions when using conductive dyes or salts. Co-solvents such as alcohols and ketones, when mixed with esters, significantly improve the solubility of dyes and conductive agents as well as the conductivity of the final ink composition. Alcohols alone, however, can have a negative impact on the solvency of the main binder resins, ink adhesion, and dry time of the ink. Also, alcohols are notoriously hygroscopic and can lead to even poorer solubility and to ink instability in the printer due to water absorption from air. Hence there is also a need to minimize the presence of alcohols in ink solvent mixtures.

Among the embodiments of this invention is a solvent system comprising an ester, a ketone, and optionally an alcohol that showed good solvency towards a wide range of resin classes and dyes, as well as conductive agents when used in the ink. The resulting ink compositions possess similar evaporation rates, dry times, print windows, and functional performance relative to their MEK counterparts.

The inks of the present invention preferably use a lower order alcohol in the range of from about 1% to about 60% of the total ink composition (by weight), more preferably from about 1% to about 40% of the total ink composition (by weight), yet more preferably about 1% to about 35% of the total ink composition (by weight). Alternatively, the inks of the present invention preferably use a lower order alcohol in the range of from about 10% to about 60% of the total ink composition (by weight), more preferably about 10% to about 40% of the total ink composition (by weight) or yet more preferably about 15% to about 55% of the total ink composition (by weight). The lower limit of alcohol suitable for the solvent blend generally is influenced by the ink's conductivity. Without alcohol, the ink might not provide sufficient conductivity. Due to their hygroscopic nature and the presence of water in solvents, particularly alcohols, the conductivity will be in most cases further improved by the presence of small amounts of water in the alcohol solvents. However, water is slow drying and is a non-solvent for ingredients such as resin binders and colorants. The upper limit of water content will be determined by the relative evaporation rate and solubility of the dyes and resins in the solvent blend. Solubility can be initial solubility or solubility observed after a period of ink aging. It is also generally preferred to limit the alcohol content in order to minimize the uptake of water during operation in CIJ printers.

Suitable lower order alcohols for the present invention are C2-C3 alkyl alcohols. Preferred alcohols include ethanol (EtOH), n-propanol (nPrOH) and isopropanol (iPrOH).

Inks according to embodiments of the present invention also preferably use a ketone to improve the overall solubility and conductivity of the ink components. The lower limit of ketone in the solvent blend depends on the solubility of the ink components in the solvent mixture and the stability of the ink over its useable life. The upper limit of ketone use in the solvent mixtures depends on the impact of using the ketone based on its relative cost, general availability for use in manufacture, and on the overall drying rate of the resulting composition. In preferred embodiments, ketones are employed in the range of from about 5% to about 50% by weight of the ink composition, more preferably from about 10% to about 45%. In other preferred embodiments, ketones are employed in the range of from about 5% to about 60% by weight of the ink composition, more preferably from about 10% to about 50% by weight of the ink composition.

Ketone that are suitable for use in the solvent mixture for embodiments of the invention include ketones having 3 to 7 carbon atoms, including the ketonic carbon (C3-C7 ketones). The ketone can be alkyl or cycloalkyl ketones. Preferably, suitable ketone solvents have a relative evaporation rate (relative to n-butyl acetate) of at least about 0.2. Specific ketones for use in the invention include acetone, diethyl ketone (DEK), methyl isopropyl ketone (MIPK), methyl n-propyl ketone (MPK), methyl isobutyl ketone (MIBK), methyl n-amyl ketone (MAK), methyl-isoamyl ketone (MIAK), cyclopentanone, and cyclohexanone, etc. The most preferred ketones are acetone, DEK, MIPK, and MPK. Methyl ethyl ketone (MEK) also can be used, optionally, in amounts from 0% to about 50% as part of the solvent mixture, but preferably is present in amounts from about 10% to about 25% by weight of the ink composition. More preferably, the ink compositions according to embodiments of the invention do not contain detectable MEK.

For reliable operation in CIJ printers, inks must possess a minimum initial conductivity or maximum solution resistivity. For example, the resistivity of a useful ink typically needs to be lower than the upper practical limitation imposed by the printer's charge control circuitry because of natural variation in raw materials, ink temperature during use and degradation in conductivity over the ink's life. For reliable operation, inks should exhibit a maximum resistivity of about 2000 Ohm-cm, and more preferably less than about 1800 Ohm-cm due to the practical restraints mentioned. Even more preferably, the resistivity range is below about 1500 Ohm-cm.

Given that alcohols and ketones affect the solution conductivity more than esters, the sum of alcohol plus ketone in the solvent mixture comprises from about 15% to about 85% of the ink composition, more preferably from about 20% to about 80% of the ink composition, by weight. Having sufficient conductivity translates into a wide time window that is allowed for applying drop charging pulses at the point of drop breakoff. Inks with sufficient conductivity exhibit a wide time range to apply drop charge pulse responsible for detecting drop positions and velocities better known as ‘phasing’ or ‘phase timing’ control. A ‘phase window’ test can be conducted on inks to establish that the ink has a suitable phase window.

The inks of the present invention preferably use esters in the range between 10% and 65% of the ink composition, preferably between 10% and 60%, more preferably about 15 to 55%. The upper limit is defined by the relative solubility of ink components as well as the ink's conductivity. The lower limit is defined together with the specific ketone employed by the overall observed evaporation rate which can correlate with the drying rate of the printed code and with the loss of solvent that is observed during operation in a CIJ inkjet printer. It is ideal that the ink exhibits fast enough ink drying rates of the printed codes in typical CIJ applications and, in the meantime, shows evaporation rates which are low enough so that the printer does not consume excessive ‘makeup’ solvent as compared with MEK based inks that current customers employ.

Esters can be any kind, but preferred are those with an appropriate evaporation rate to improve the bulk ink evaporation rate relative to the lower order alcohols employed. The esters preferred for use with this invention are C1-C3 alkyl esters of C1-C3 carboxylic acids, for example C1-C3 alkyl esters of C2-C3 carboxylic acid or C2-C3 alkyl esters of C1-C3 carboxylic acid. Specific alkyl esters that are useful for the invention include methyl acetate (MeOAc), ethyl acetate (EtOAc), isopropyl acetate (iPrOAC), and n-propyl acetate (nPrOAC). The most preferred ester solvents are ethyl acetate and isopropyl acetate.

Initial evaporation rates of the solvent mixtures useful for the invention generally correlate very well with makeup solvent use in CIJ printers and can be measured by simply observing the loss in mass on a precision balance over time. Makeup solvent is a solvent or solvent mixture used in the ink composition, which is added to the ink in a controlled way during printer operation to compensate for the solvent loss in order to maintain ink viscosity and correct solvent balance in the ink composition. For an ink that uses a mixture of different solvents, the solvent balance in the makeup is typically different from the solvent balance in the ink due to differences in relative evaporation rates of the solvents. For example, an ink using acetone/ethanol as the main ink solvents will require a much higher acetone to ethanol ratio in the makeup than is in the ink as acetone is much more volatile than ethanol. The empirically derived evaporation rate for an MEK based ink (>60% MEK content in the ink composition), for example, is shown in FIG. 1. As long as the makeup has the right balance to keep the solvent composition of the ink in the printer constant, the makeup consumption in the printer can be estimated based on the solvent balance in the ink.

As seen in FIG. 1, the loss of MEK with time is near-linear and the rate of evaporation is constant as long as the surface area of MEK is kept constant. Typical MEK-based inks evaporate at a rate about 20 mg per minute at about 20° C., depending on the other components in the ink composition. A test of this nature can be used to compare different inks for the rate o solvent loss or makeup consumption in the printer as follows, as long as the comparison tests are completed in the same environment with the same volume of ink on the same surface area. Approximately 5 grams of ink was placed in a 5.1 cm diameter aluminium pan, which was then placed on an analytical balance with an enclosure, e.g., model Sartorius A200S. The weight loss was recorded every two minutes over a 20-minute time span and the weight loss value was plotted against time to calculate the evaporation rate. The test was performed at approximate 20° C.

Because makeup fluids can be expensive for the end users, in general it is preferred that the actual evaporation rate for the ink be no more than about 30 mg per minute to minimize impact of cost of operation relative to MEK based inks, based on the test described above.

Initial relative evaporation rates (REA) of solvent blends can be predicted by using the solvent ratios and the empirical evaporation rates of the pure solvents relative to n-butyl acetate, shown in Table 1. For example, the initial relative evaporation of the solvent blend of 25% acetone (REA=6.3), 55% iPrOAc (REA=3.0), and 20% EtOH (REA=1.7) can be estimated by the following calculation: (0.25)*(6.3)+(0.55)*(3.0)+(0.20)*(1.7)=3.6. This type of calculation can be used to estimate relative ink drying time to guide ink formulation (see Table 2, below), however, the evaporation rate of a solvent mixture in an ink composition is likely not constant. The rate of evaporation of the mixture will likely change due to both solvent balance shift and ink viscosity increase as a result of evaporation. In addition, how the solvent(s) interact with the resins and other components in the ink composition also can impact solvent evaporation. As a result, actual ink drying rates as measured will likely deviate significantly from the calculations based on the reported relative solvent evaporation rates in literature.

TABLE 1

Reported Evaporation Rate of Pure Solvents Relative to n-Butyl Acetate.

| Solvent | Solvent Type | Relative Evaporation Rate |
|---|---|---|
| Acetone | ketone | 6.3 |
| MEK | ketone | 3.8 |
| MIPK | ketone | 2.9 |
| MPK | ketone | 2.3 |
| DEK | ketone | 2.3 |
| MIBK | ketone | 1.6 |
| MIAK | ketone | 0.5 |
| MAK | ketone | 0.4 |
| Cyclohexanone | Ketone | 0.3 |
| MeOAc | ester | 6.0 |
| EtOAc | ester | 4.1 |
| iPrOAC | ester | 3.0 |
| nPrOAc | ester | 2.3 |
| EtOH | alcohol | 1.7 |
| iPrOH | alcohol | 1.7 |
| nPrOH | alcohol | 1.0 |

Data source of solvent evaporation rates: Eastman ™ solvent selector chart.

TABLE 2

Calculated Relative Evaporation Rate of Solvent Mixtures.

| Solvent Mixture | Ketone | Ester | Alcohol | % total alcohol + ketone | Relative evaporation rate estimate |
|---|---|---|---|---|---|
| A | Acetone 25% | iPrOAC 55% | EtOH 20% | 45 | 3.6 |
| B | Acetone 30% | EtOAc 40% | nPrOH 30% | 60 | 3.8 |
| C | Acetone 15% | EtOAc 50% | iPrOH 35% | 50 | 3.6 |
| D | Acetone 25% | MeOAc 20% | EtOH 55% | 80 | 3.7 |
| E | Acetone 5% | MeOAc 65% | EtOH 30% | 35 | 4.7 |
| F | Acetone 50% | MeOAc 20% | EtOH 30% | 80 | 4.9 |
| G | Acetone 5% | MeOAc 35% | EtOH 60% | 65 | 3.4 |
| H | MIPK 30% | MeOAc 40% | nPrOH 30% | 60 | 3.6 |
| I | MIPK 10% | EtOAc 70% | EtOH 20% | 30 | 3.5 |
| J | MIPK 30% | EtOAc 60% | EtOH 10% | 40 | 3.5 |
| K | MIPK 50% | EtOAc 40% | EtOH 10% | 60 | 3.3 |
| L | MPK 20% | EtOAc 70% | EtOH 10% | 30 | 3.5 |
| M | DEK 20% | EtOAc 70% | EtOH 10% | 30 | 3.5 |
| N | MIAK 20% | MeOAc 50% | nPrOH 30% | 50 | 3.4 |
| O | MAK 20% | MeOAc 50% | nPrOH 30% | 50 | 3.4 |

The advantages of inks according to embodiments of this invention include avoiding reliance on high amounts of MEK or avoiding MEK altogether as a solvent for inkjet ink compositions. When anticipated regulations are put in place with respect to MEK or regional restrictions on importing MEK-containing products are enforced, the use of MED in inkjet inks will become a greater problem. Using a combination of non-MEK solvents effectively mitigates these risks. In addition, a mixture of solvents has advantages over a singular solvent in inkjet products from regulatory perspective in general. A singular solvent type in a CIJ ink would require the corresponding makeup fluid composed of the same solvent in its nearly pure form, which can be prone to regulatory scrutiny if this solvent is restricted in any way.

The inkjet inks according to the invention also contain a binder resin. Such binder resins are known in the art and any such resins as appreciated by the person of skill, can be used. Examples of suitable resins include acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins, and mixtures thereof. Preferred binder resins for use with the invention include cellulose esters such as cellulose acetate butyrate and cellulose acetate propionate, nitrocellulose resin, styrene acrylic resins, silicon resins, rosin esters, and polyurethane resins. Most preferred binder resins include nitrocellulose resin; cellulose acetate butyrate resins CAB-551-0.01, CAB-553-0.4, cellulose acetate propionate resin CAP-482-0.5, all from Eastman Chemical™; styrene acrylic resin such as Joncryl-611, Joncryl-586, from BASF.

Colorants useful in the inventive ink compositions include any of the colorants known to skilled artisans. In particular, solvent soluble dyes such as azo-metal complex dyes and azo dyes, are suitable to use in the disclosed inks. Most preferred colorants are solvent black 29, solvent black 27, and solvent black 3. Most preferred colorants are solvent dyes that also provide conductivity, such as C.I. solvent black 29, C. I. solvent black 27, and C.I. solvent red 122. Examples of C.I. solvent black 29 are Valifast Black 3808, Orasol Black X-55. Examples of C.I. Solvent Black 27 are Valifast Black 3830, and Valifast Black 3820. Valifast Red 3306 is an example for C.I. Solvent Red 122.

Ink compositions for the continuous inkjet process should exhibit solution conductivities greater than 200 µSiemens, and more preferably greater than 500 µSiemens, and therefore optionally include a conductive agent (an ionic species added to the ink composition to impart measurable conductivity). Preferred conductive agents are cation/anion pairs (salts). Preferably the cations are alkali earth metals, alkali metals (i.e., $Li^+$, $Na^+$, $K^+$), ammonium, alkyl/aryl ammonium ($NR_4^+$, R═H, alkyl, aryl) and alkyl/aryl phosphonium ($PR_4^+$, R═H, alkyl, aryl), and the like. Typical anions for the cation/anion pairs are halides, halo-phosphates (e.g., hexofluorophosphate), tetrafluoroborate, halo-antimonates, halo-borates, phenyl borates, nitrates, phosphates, sulfates, phosphonates, sulfonates, carbonates, carboxylates, thiocyanates, acetates, triflates, tosylates and the like. Conductive agents are typically only added to impart just enough electrical conductivity for use in inkjet printing to ink compositions to be used in inkjet printing. In a typical such ink composition, conductive agents are provided in an amount from 0.1 to 2.5% by weight. In some formulations the colorant can function as the conductive agent.

The ink composition also optionally can further include one or more additives such as plasticizers, surfactants, defoamers, humectants, adhesion promoters, corrosion inhibitors, and the like, or combinations thereof. Suitable plasticizers can be polymeric and can be added in addition to a binder resin. Plasticizers generally have molecular weights that are less than 5,000 g/mol. Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, triethyl citrate, tributyl citrate, acetyl tri-n-butyl citrate, polyurethanes, acrylic polymers, lactates, oxidized oils such as epoxidized soybean oil, oxidized linseed oil, and sulfonamide-based plasticizers such as Plasticizer 8.

When present, the plasticizer preferably is present in an amount from about 0.01% to about 5.0%, preferably from about 0.1% to about 2.5%, and more preferably from about 0.25% to about 1.0% by weight of the ink composition.

Examples of surfactants include siloxanes, silicones, silanols, polyoxyalkyleneamines, propoxylated (poly(oxypropylene))diamines, alkyl ether amines, nonyl phenol ethoxylates, ethoxylated fatty amines, quaternized copolymers of vinylpyrrolidone and dimethyl aminoethyl methacrylate, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, fluorinated surfactants, such as perfluoropoly ethers, modified perfluoropoly ethers, glycol-based perfluoroalkyl ethers, perfluoroalkyl substituted polyethers, and mixtures thereof. A specific example of a suitable polymeric surfactant is Silicone Fluid SF-69 which is a blend of silanols and cyclic silicones. A specific example of a siloxane polyalkyleneoxide copolymer surfactants includes SILWET™ L-7622. In any of the embodiments, the surfactant additive, when present, preferably is present in an amount from about 0.001% to about 2.0% by weight and more preferably from about 0.005% to about 0.5% by weight of the ink composition.

construed as an admission that the invention is not entitled to antedate such disclosure by virtue of prior invention.

Example 1: Correlation Between Evaporation Rate Estimates and Measured Values

Ink formulations were made by combining solvents in specific ratios with CAB-553-0.4 resin to produce a viscosity of about 4 cPs (CAB resin at between 4.0 and 6.5%) and a solvent black dye at 7.5% as shown in Table 3, below, which also shows measuring the evaporation rates and comparing the normalized percentage evaporation rates of each ink versus the pure MEK control.

The evaporation rate for each ink was measured and compared with calculated values. As an example, the results show that when using MPK as a singular solvent, the measured evaporation rate versus the MEK control was about 16 percentage points lower than the calculated value; when combining MPK with SDA-3c ethanol at an 80/20 ratio, the difference was 1 percentage point. See Table 3.

TABLE 3

Comparison of calculated and measured evaporation rates of ink formulations.

| Ink Number | Ketone | Alcohol | Ester | Alcohol + Ketone Percentage | Estimated Relative Evaporation Rate vs. nBuOAc | % vs MEK factor | Measured Evaporation Rate mg/min | % vs MEK factor | Difference from estimate delta |
|---|---|---|---|---|---|---|---|---|---|
| 1 | MEK 100% | none | none | 100 | 3.8 | — | 21 | — | — |
| 2 | MPK 100% | none | none | 100 | 2.3 | 60.5 | 9.4 | 44.8 | −16 |
| 3 | MPK 80% | SDA3c 20% | none | 100 | 2.2 | 57.4 | 12.2 | 58.1 | +1 |
| 4 | Acetone 80% | SDA3c 20% | none | 100 | 4.8 | 126.8 | 41.5 | 197.6 | +71 |
| 5 | None | SDA3c 20% | EtOAc 80% | 20 | 3.6 | 95.3 | 25.0 | 119.0 | +24 |
| 6 | MPK 5% | SDA3c 20% | EtOAc 75% | 25 | 3.5 | 92.9 | 21.9 | 104.3 | +11 |
| 8 | Acetone 5% | SDA3c 20% | EtOAc 75% | 25 | 3.7 | 98.2 | 24.3 | 115.7 | +18 |
| 7 | none | SDA3c 25% | EtOAc 75% | 25 | 3.5 | 92.1 | 22.6 | 107.6 | +16 |
| 9 | none | SDA3c 60% | EtOAc 40% | 60 | 2.7 | 70.0 | 19.6 | 93.3 | +23 |
| 10 | MPK 5% | SDA3c 20% | MeOAc 75% | 25 | 5.0 | 130.4 | 38.4 | 182.9 | +52 |
| 11 | MPK 5% | nPrOH 20% | MeOAc 75% | 25 | 4.8 | 126.7 | 37.6 | 179.0 | +52 |
| 12 | MPK 20% | SDA3c 60% | EtOAc 20% | 80 | 2.3 | 60.5 | 17.0 | 81.0 | +20 |
| 13 | Acetone 20% | SDA3c 60% | EtOAc 20% | 80 | 3.1 | 81.6 | 22.9 | 109.0 | +27 |
| 14 | MiPK 60% | iPrOH 20% | iPrOAc 20% | 80 | 2.7 | 70.5 | 14.5 | 69.0 | −1 |
| 15 | MiPK 30% | SDA3c 30% | iPrOAc 40% | 60 | 2.6 | 67.9 | 15.7 | 74.8 | +7 |
| 16 | Acetone 30% | SDA3c 30% | iPrOAc 40% | 60 | 3.6 | 94.7 | 26.5 | 126.2 | +31 |
| 17 | MnAK 50% | iPrOH 20% | MeOAc 30% | 70 | 2.3 | 61.6 | 21.8 | 103.8 | +42 |
| 18 | MnAK 5% | SDA3c 20% | MeOAc 75% | 25 | 4.9 | 127.9 | 39.0 | 185.7 | +58 |
| 19 | MPK 25% | SDA3c 60% | MeOAc 15% | 85 | 2.5 | 65.7 | 19.8 | 94.3 | +29 |
| 20 | MPK 25% | nPrOH 30% | MeOAc 45% | 55 | 3.6 | 94.1 | 26.7 | 127.1 | +33 |
| 21 | MiPK 25% | SDA3c 60% | MeOAc 15% | 85 | 2.6 | 69.6 | 20.7 | 98.6 | +29 |
| 22 | MiPK 25% | iPrOH 60% | MeOAc 15% | 85 | 2.6 | 69.6 | 19.1 | 91.0 | +21 |
| 23 | MiPK 30% | nPrOH 30% | MeOAc 40% | 60 | 3.6 | 93.9 | 26.5 | 126.2 | +32 |

5. Examples

This invention is not limited to the particular processes, compositions, or methodologies described, as these may vary. The terminology used in the description is for the purpose of describing the particular versions or embodiments only, and is not intended to limit the scope of the present invention which will be limited only by the appended claims. Although any methods and materials similar or equivalent to those described herein can be used in the practice or testing of embodiments of the present invention, the preferred methods, devices, and materials are now described. All publications mentioned herein, are incorporated by reference in their entirety; nothing herein is to be These results showed that although evaporation rates for pure solvents are based on empirical evidence and are often used by those skilled in the art to make first approximations of the evaporation rate of a mixture of solvents, the estimates for solvent blends have been found to deviate significantly from the calculations and can only be used as starting points when determining the composition of the makeup or estimating ink dry time.

Figure 2A:
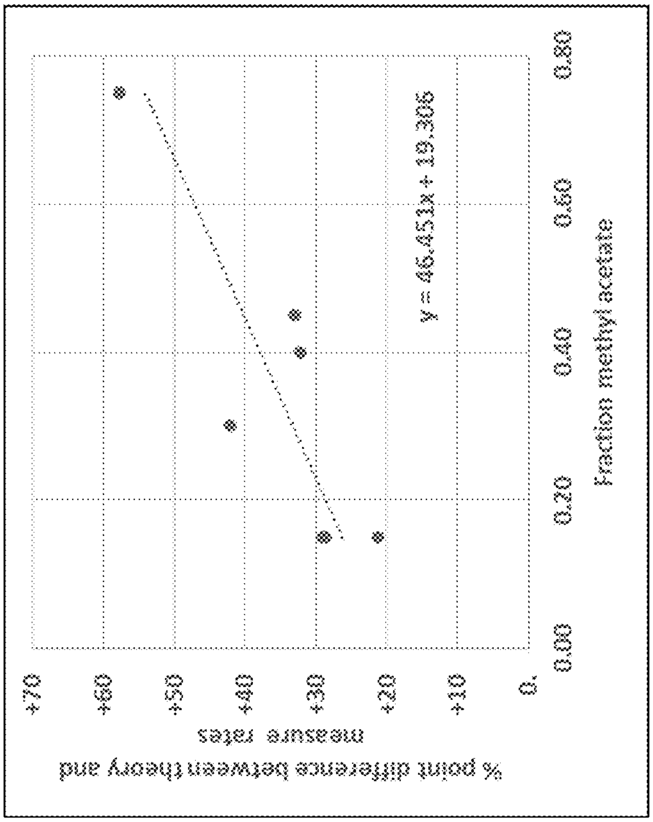
FIG. 2. Shows the differences between the calculated and measured evaporation rates as a function of the fraction of highly volatile solvents in the solvent blend (methyl acetate, FIG. 2A; acetone, FIG. 2B).
Figure 2B:
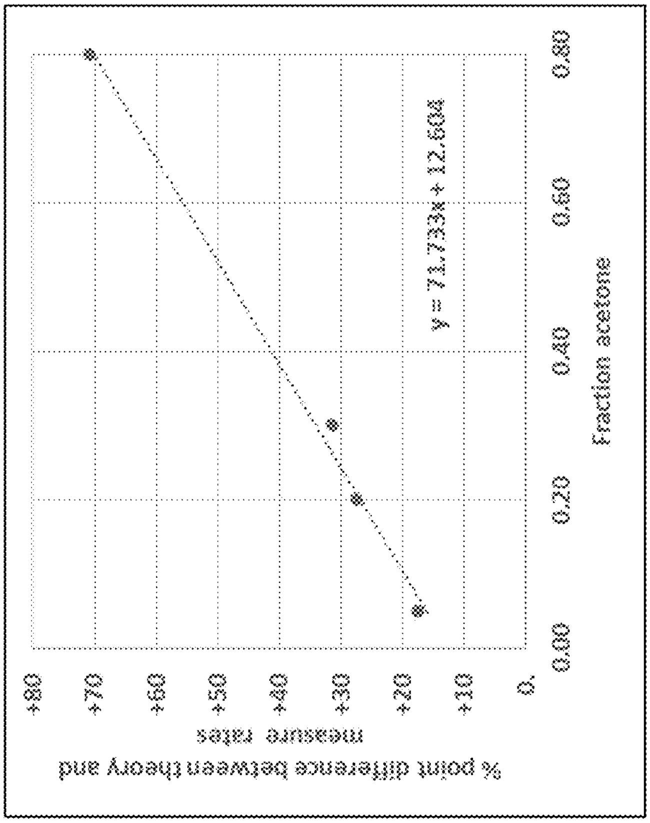

As shown in FIG. 2, the actual evaporation rate of a given ink composition tended to trend higher with an increased ratio of highly volatile solvents. Due to this deviation, in the case of solvents with high volatility such as methyl acetate, ethyl acetate, and acetone, the amount of such solvents that could be employed in said inks can be effectively greatly reduced to achieve target ink drying rates. However, once adjustments were made, a wide variety of inks can be formulated within acceptable evaporation ranges using different varieties and ratios of ketone:alcohol:ester.

Example 2: Selection of Materials

Different ternary solvent mixtures were formulated and their properties measured: e.g., viscosity (cPs) at 25° C.; resistivity (Ohm-cm) at 25° C.; evaporation rates; and resolubility of dried ink. The formulations used CAB-553-0.4 (an ethanol soluble binder resin) and two classes of solvent black dyes, Valifast Black 3808 (VB3808; solvent black 29) and 3830 (VB3830; solvent black 27). Their compositions and properties are presented in Table 4, below. KPF6 salt (potassium hexafluorophosphate) is used here as a conductive agent.

TABLE 4

Ink Compositions Containing CAB-553-0.41 ™ Resin and Different Solvent Black Dyes.

| Ink No. | % Resin | Dye type | % dye | % $KPF_6$ | % MEK | % EtOAc | % SDA3c | % MPK | ketone + SDA3c as % solvent | Viscosity cP, 25° C. | Resistivity Ohm-cm, 25° C. | Measured Evaporation Rate mg/min |
|---|---|---|---|---|---|---|---|---|---|---|---|---|
| 24 | 6.5 | VB3808 | 7.5 | — | 100.0 | 0.0 | — | — | 100.0 | 4.12 | 577 | 21 |
| 25 | 4 | VB3808 | 7.5 | — | — | 70.8 | 17.7 | — | 17.7 | 3.56 | 1682 | 25 |
| 26 | 4 | VB3808 | 7.5 | — | — | 70.8 | — | 17.7 | 17.7 | 5.36 | 1950 | 12 |
| 27 | 4 | VB3808 | 7.5 | — | — | 35.4 | 53.1 | — | 53.1 | 4.41 | 1028 | 20 |
| 28 | 4 | VB3808 | 7.5 | — | — | 13.3 | 53.1 | 22.1 | 75.2 | 4.35 | 932 | 15 |
| 29 | 4 | VB3830 | 8.5 | — | — | 70.0 | 17.5 | — | 17.5 | 3.47 | 3164 | 25 |
| 30 | 4 | VB3830 | 8.5 | 1.0 | — | 70.0 | 17.5 | — | 17.5 | 3.79 | 1800 | 26 |
| 31 | 4 | VB3830 | 8.5 | — | — | 17.5 | 52.5 | 17.5 | 70.0 | 4.31 | 1684 | 17 |

For ink composition numbers 25 and 26 containing Valifast Black 3808 (C.I. Index Solvent Black 29), a high level of ethyl acetate in the ink composition resulted in relative high resistivity but still within (i.e. below) 2000 Ohm-cm. Increasing the level of ethanol and/or MPK (see ink composition numbers 27 and 28) improved ink resistivity. In the presence of Valifast Black 3830 (C.I. Index Solvent Black 27) as shown for ink composition numbers 29 and 30, an additional conductive agent of 1% $KPF_6$, was used to reduce the resistivity to minimum acceptable levels. In comparison, with a ternary blend (ink composition number 31) the resistivity was further reduced even without a conductive agent.

Table 5 provides formulations and properties of inks containing CAB-551-0.01, a resin which exhibits limited or no solubility in pure alcohol.

TABLE 5

Ink Compositions Containing CAB-551-0.01 Resin and Different Solvent Black Dyes.

| Ink No | % Resin | Dye type | % dye | % $KPF_6$ | % MEK | % EtOAc | % SDA3c | % MPK | ketone + SDA3c as % solvent | Viscosity cP, 25° C. | Resistivity Ohm-cm, 25° C. | Measured Evaporation Rate mg/min |
|---|---|---|---|---|---|---|---|---|---|---|---|---|
| 32 | 10.5 | VB3808 | 7.5 | — | 100 | 0.0 | — | — | 100.0 | 3.76 | 652 | 20 |
| 33 | 8 | VB3808 | 7.5 | — | — | 67.6 | 16.9 | — | 16.9 | 3.74 | 1796 | 23 |
| 34 | 8 | VB3808 | 7.5 | — | — | 16.9 | 50.7 | 16.9 | 67.6 | 4.42 | 1130 | 16 |
| 35 | 8 | VB3830 | 8.5 | 1.0 | — | 66.0 | 16.5 | — | 16.5 | 3.78 | 1736 | 22 |
| 36 | 8 | VB3830 | 8.5 | — | — | 16.7 | 50.1 | 16.7 | 66.8 | 4.37 | 1619 | 16 |

For these ink compositions, a ternary solvent blend provided better ink conductivity compared to a high ethyl acetate ink in combination with either Solvent Black 29 (see ink composition numbers 33 and 34) or Solvent Black 27 (see ink composition numbers 35 and 36).

Ink formulations that use Joncryl 611, which is a low acid number styrenated acrylic resin with low alcohol solubility, are set forth in Table 6.

TABLE 6

Ink Compositions Containing Joncryl 611 Resin and Valifast Black Dye.

| Ink Number | % Resin | % dye | % MEK | % EtOAc | % SDA3c | % MPK | ketone + SDA3c as % solvent | Viscosity cP, 25° C. | Resistivity Ohm-cm, 25° C. | Measured evaporation rate (mg/min) | Ink Resolubility (drops) |
|---|---|---|---|---|---|---|---|---|---|---|---|
| 37 | 24 | 7.5 | 100.0 | 0.0 | — | — | 0.0 | 3.99 | 993 | 18 | 26 |
| 38 | 18 | 7.5 | — | 52.2 | 22.3 | | 22.3 | 3.49 | 2325 | 21 | N/T |
| 39 | 18 | 7.5 | — | 52.2 | 18.6 | 3.7 | 22.3 | 3.58 | 2281 | 21 | 29 |
| 40 | 18 | 7.5 | — | 14.9 | 44.7 | 14.9 | 59.6 | 4.46 | 1491 | 15 | 57 |
| 41 | 18 | 7.5 | — | 14.9 | 14.9 | 44.7 | 59.6 | 3.26 | 1264 | 15 | 32 |

Joncryl 611 is a useful base resin for CLU formulations to achieve good adhesion on certain materials such as glass surfaces and for reliable printer operation due to its good dry ink resolubility. Due to its relatively low molecular weight, a high level of resin solids was employed to achieve the necessary ink viscosity. Joncryl 611 has poor solubility in ethanol due to low acid number. A high level of solubilizing ester or ketone solvent was therefore inherently required to simply dissolve the material. However, high ester content (see ink composition numbers 38 and 39) resulted in high resistivity of the ink. An ink resolubility comparison was performed to gauge the impact of the combined high solids and high ester levels. Resolubility of the dried ink was evaluated by placing two drops of ink in an aluminum pan and allowing the ink to dry. Once dried, the solvent mixture used in the ink was pipetted onto the ink one drop at a time until the dried ink was completely redissolved. The number of drops required to redissolve the ink is reported. Increasing alcohol ratio (see ink composition number 40) adversely affected the resolubility of the ink, which is disadvantageous to printer performance. In contrast, increasing ketone ratio (see ink composition number 41) was found to improve resolubility of the dried ink significantly while maintaining good ink resistivity.

Example 3: Demonstration of General Adhesion and Printer Performance

Several ink formulations as shown in Table 7, below, containing CAB-553-0.4™ or CAB-551-0.01 as the main binder resin were prepared by mixing all the ink components in the corresponding solvent mixtures and the resulting ink was used for adhesion test and print window evaluation.

TABLE 7

Exemplary Ink Formula Components with CAB resins.

| Ink Formula Component | Inventive Ink A | Inventive Ink B | Inventive Ink C | Comparative Ink 1 | Comparative Ink 2 | Comparative Ink 3 | Comparative Ink 4 |
|---|---|---|---|---|---|---|---|
| Ethyl Acetate | 63.4% | 16.0% | 16.0% | — | 16.3% | 16.3% | 32.6% |
| Ethanol | 16.9% | 16.0% | 32.1% | — | 48.9% | 48.9% | 48.9% |
| MPK | 4.2% | 48.2% | — | — | 16.3% | — | — |
| MEK | — | — | — | 77.9 | — | — | — |
| Acetone | — | — | 32.1% | — | — | 16.3% | — |
| Eastman CAB 553-0.4 | 4.0% | — | — | — | — | — | — |
| Eastman CAB 551-0.01 | — | 7.7% | 7.7% | 9.2% | 6.5% | 6.5% | 6.5% |
| Staybelite Ester 10 | 3.0% | 4.2% | 4.2% | 5.0% | 4.0% | 4.0% | 4.0% |
| Valifast Black 3808 | 7.5% | 7.4% | 7.4% | 7.4% | 7.5% | 7.5% | 7.5% |
| Silwet 7622 | 1.0% | 0.5% | 0.5% | 0.5% | 0.5% | 0.5% | 0.5% |
| Total | 100.0% | 100.0% | 100.0% | 100.0% | 100.0% | 100.0% | 100.0% |
| Viscosity (cPs, 25° C.) | 4.63 | 3.86 | 3.42 | 3.55 | 3.93 | 3.54 | 4.23 |
| Resistivity (Ohm-cm, 25° C.) | 1756 | 1130 | 804 | 760 | 1136 | 1048 | 1287 |
| Evaporation Rate (mg/min) | 21.1 | 13.8 | 28.8 | 20.6 | 13.8 | 22.3 | 16.4 |
| Resolubility (drops) | 50 | 39 | 48 | 32 | 60 | 54 | 68 |
| Ink Stability | Good | Good | Good | Good | Poor | Poor | Poor |

In the inks in Table 5, both CAB resins were compatible using the ternary solvent blends. In Inventive ink A, a relatively high ethyl acetate ratio was employed and the resulting ink composition showed an acceptable resistivity of 1756 Ohm-cm. In inventive inks B and C, a relatively high ethanol and ketone ratio was used to test the solubility limit of CAB-551-0.01™ in the solvent blend. It was found that all ink components were compatible and provided good ink properties vs. an MEK-based control, shown as Comparative ink number 1. In Comparative ink numbers 2, 3 and 4, however, replacing a portion of the ketones with ethanol or completely removing ketones resulted in worse resolubility of dried ink. These inks were further tested with accelerated aging by storing them in a 60° C. oven for 1 week followed by 1 day in a −15° C. freezer, known as a shock test, to examine the ink stability over time. Both inventive ink numbers 2 and 3 were more stable over aging than their counterparts (comparative ink numbers 2, 3 and 4 with lower ketone ratio), indicating the solvency advantage of ketones.

The functional performance of inventive inks A, B, and C versus comparative ink number 1 were assessed by testing their dry time and tape adhesion on various substrates. Dry time is defined as the time required for an ink code to dry to tack-free after being printed on the substrate, and was measured by recording the time between printing the code and the point where no smearing of the code was observed when gently rubbed. The dry times of the three inventive inks were found to be comparable to that of a typical MEK based ink. Inventive ink A with high ethyl acetate ratio had a dry time of 1 second or less. Inventive ink numbers B and C with high ethanol and ketone ratios had a dry time of 1 to 2 seconds depending on the substrate.

The tape transfer test was performed by applying a piece of 3M Scotch™ Transparent Tape #600 (or equivalent) over the entire printed code using one firm (2-3 kg) rub. The tape was removed rapidly at a ca. 180° angle and then the percentage of code transferred to the tape was examined. All three inventive inks showed good to excellent tape transfer performance on all substrates tested. (Tape transfer test rating scale: Excellent=codes showed no change; Good=codes were legible with less than 25% transfer; Moderate=codes showed greater than 50% transfer but were still legible; Poor=codes were illegible.) See Table 8, below.

TABLE 8

Dry time and tape transfer test results.

| Substrates | Inventive Ink A | Inventive Ink B | Inventive Ink C | Comparative Ink 1 |
|---|---|---|---|---|
| | Dry time (in seconds at 23° C.) | | | |
| Glass | 0.5 | 1.0 | 1.0 | 1.0 |
| Aluminum | 0.5 | 1.0 | 1.0 | 1.0 |
| Polyester | 0.5 | 1.5 | 1.0 | 1.0 |
| PVC | 0.5 | 1.5 | 1.5 | 1.0 |
| HDPE | 0.5 | 1.5 | 1.0 | 1.0 |
| Average | 0.5 | 1.3 | 1.1 | 1.0 |
| | Tape transfer resistance | | | |
| Glass | Excellent | Excellent | Excellent | Excellent |
| Aluminum | Excellent | Excellent | Excellent | Excellent |
| Polyester | Excellent | Excellent | Excellent | Excellent |
| PVC | Good | Excellent | Excellent | Excellent |
| HDPE | Good | Good | Good | Good |

To evaluate the fundamental printer performance of the inks, a phase window test was performed at room temperature on a printer rig modified from a Videojet® 1580 printer, using a 60 micron nozzle, to print a 34-high, solid block image at each of the 16 different phase offsets. The printed image is composed of approximately 200 columns in the horizontal direction and 34 dots in the vertical direction in each column. The print quality of the image printed at each phase offset was then evaluated by examining the printed dots and rated based on the following scale: Good=no misplaced or missing dots; Marginal=some slightly misplaced dots which are still visible in the printed image; Poor=missing dots or wavy image. The results are shown in Table 9, below. The inventive inks had 6 and 7 acceptable phases including 'Good' and 'Marginal' phases. This performance is similar to the MEK control, Comparative ink number 1, as well as comparative ink number 5 (see Table 10 for ink composition).

TABLE 9

Phase window test results.

| Ink | Number of good phases | Number of marginal phases |
|---|---|---|
| Inventive ink A | 5 | 1 |
| Inventive ink B | 7 | 0 |
| Inventive ink C | 7 | 0 |
| Comparative ink 1 | 7 | 0 |
| Comparative ink 4 | 3 | 4 |
| Comparative ink 5 | 7 | 0 |

Example 4: Demonstration of Specific Application Vs. MEK-Based Ink

Comparative ink 5, comprising MEK, a solvent black dye, Joncryl 611, a silicon resin and urethane resin, provides for good adhesion to glass. On optimizing the resin types and ink solids as shown with Inventive ink D, the ink exhibited acceptable solution resistivity and the ingredients were found to be compatible with the ternary solvent mixture. Inventive ink D and Comparative ink 5 also showed similar evaporation rate. In comparison, the resin combination when blended in a mixture of ethyl acetate and ethanol in the absence of MPK was found to be incompatible and the ink components were insoluble as provided in Table 10 with Comparative ink 6.

TABLE 10

Exemplary Ink Formula Components for Glass Adhesion.

| Ink Formula Component | Inventive ink D | Comparative ink 5 | Comparative ink 6 |
|---|---|---|---|
| SDA-3c | 20.7% | — | 49.8% |
| Ethyl acetate | 17.7% | — | 21.0% |
| MPK | 31.5% | — | — |
| MEK | — | 61.1% | — |
| CDA-19 | — | 2.1% | — |
| Joncryl 611 | 10.8% | 15.5% | 11.0% |
| Polyurethane (70% in ethyl acetate) | 5.8% | 8.3% | 5.9% |
| Silicon resin | 2.2% | 3.1% | 2.2% |
| Valifast Black 3808 | 9.7% | — | 9.0% |
| Valifast Black 3878 | — | 8.3% | — |
| Silane A-187 | 1.6% | 1.6% | 1.1% |
| TOTAL | 30.1% | 36.8% | 29.2% |
| Solubility, initial | SOLUBLE | SOLUBLE | INSOLUBLE |
| Solubility, post aging | SOLUBLE | SOLUBLE | INSOLUBLE |
| Viscosity (cPs, 25° C.) | 3.67 | 3.9 | Not tested |
| Resistivity (Ohm-cm, 25° C.) | 1645 | 1300 | |
| Evaporation rate (mg/min) | 17.2 | 19.4 | |
| Dry time (seconds) | 1.5 | 1.6 | |
| Glass adhesion, dry | Good | Good | |
| Glass adhesion, wet | Good | Good | |

Inventive ink D and Comparative ink 5 were printed and tested for dry time on four different substrates (glass, aluminium, polyester, and PVC). The results were comparable (see Table 10). The adhesion of Inventive ink D was tested on glass microscope slides using a dry thumb rub test (Glass adhesion, dry) and a wet rub test (Glass adhesion, wet). In these tests, codes were printed on glass slides using a Videojet 1000 line print rig. After a waiting period of 16 hours, the slides were subjected to 10 times of thumb rubs across the entire code with medium pressure under dry conditions. In the wet rub test, the coded glass slides were first aged in a humidity cabinet (30° C./50% RH) for about 4 hours, and then soaked in an ice water bath overnight. The wet glass slides were then subjected to 10 times of thumb rubs across the entire code with medium pressure. The adhesion results were rated based on the following scale: Good=all codes remained fully legible after 10 thumb rubs; Moderate=part of the codes was removed after 10 thumb rubs but all codes remained fully legible after 5 thumb rubs; Poor=codes were illegible after 5 thumb rubs. The results for adhesion of inventive ink D matched that of the Comparative ink 5.

To achieve faster dry time, further examples of inventive inks were formulated as described in Table 11. Three different types of plastic substrates, including a polyester sheet, a BOPP film, and a polyethylene film, were selected to evaluate the dry time performance of these inks. Decreasing the quantity of less volatile solvent, such as alcohols, was found to reduce the dry time of the inks. Inventive inks E, F, and G contain a nitrocellulose resin, a solvent black dye, or a mixture of solvent black and solvent red dyes, and a combination of MPK and acetone in addition to ethyl acetate. Both Inventive inks F and G were able to achieve an average dry time of less than 1 second and good rub resistance on the plastic films tested. In addition, ink resistivity was sufficiently low for each of the three inventive inks, as demonstrated by their excellent phase window performance. Inventive ink H contains CAB resin and a solvent black dye, in the absence of any alcohols. The resulting ink also showed less than one second dry time and good adhesion on the plastic films tested. Inventive inks E, F and G demonstrate that satisfactory results can be achieved using inks according to the present invention that contain lower amounts of alcohol as compared to Inventive inks A to D, and Inventive ink H demonstrates that alcohol may be omitted from inks of the present invention and satisfactory performance can still be obtained.

| Ink Formula Component | Inventive ink E | Inventive ink F | Inventive ink G | Inventive ink H |
|---|---|---|---|---|
| Ethyl Acetate | 45.7% | 54.0% | 50.0% | 55.0% |
| iPrOAC | — | — | — | — |
| Acetone | 9.6% | 7.0% | 7.0% | 7.0% |
| MEK | — | — | — | — |
| MPK | 27.4% | 20.0% | 25.0% | 20.0% |
| Ethanol | — | — | — | — |
| iPrOH | 2.9% | 2.7% | 2.7% | — |
| $H_2O$ | — | 1.0% | 1.0% | 1.0% |
| Nitrocellulose | 6.7% | 6.3% | 6.3% | — |
| Eastman CAB 551-0.01 | — | — | — | 8.0% |
| Valifast Black 3808 | 7.7% | — | — | — |
| Valifast Black 3830 | — | 4.0% | 6.0% | 8.0% |
| Valifast Black 3820 | — | 4.0% | — | — |
| Valifast Red 3306 | — | — | 2.0% | — |
| Tetrabutylammonium Bromide | — | 1.0% | — | — |
| Tetrabutylammonium Hexafluorophosphate | — | — | — | 1.0% |
| TOTAL | 100.0% | 100.0% | 100.0% | 100.0% |
| Viscosity (cPs, 25° C.) | 4.23 | 4.37 | 4.3 | 3.87 |
| Resistivity (ohms cm, 25° C.) | 1097 | 1487 | 1241 | 1416 |
| Dry time on plastic films (seconds) | 1.1 | 0.8 | 0.9 | 0.9 |

-continued

| Ink Formula Component | Inventive ink E | Inventive ink F | Inventive ink G | Inventive ink H |
|---|---|---|---|---|
| Initial thumb rub on plastic films | Good | Good | Good | Good |
| Phase window | 9 good phases | 7 good phases | 8 good phases | Not tested |

REFERENCES

All references listed below and throughout the specification are hereby incorporated by reference in their entirety.

1. U.S. Pat. No. 8,110,031.
2. U.S. Pat. No. 5,466,287.

CLAUSES OF THE INVENTION

Clause 1. An inkjet ink composition comprising:

a) a binder resin;

b) a colorant; and c) a solvent mixture containing:

1) a C1-C3 alkyl ester of C1-C3 carboxylic acid;

2) a C3-C7 ketone, and 3) optionally a C2-C3 alkyl alcohol.

Clause 2. The inkjet ink composition of clause 1, which does not contain methyl ethyl ketone.

Clause 3. The inkjet ink composition of clause 1 or clause 2, wherein the C1-C3 alkyl ester of C1-C3 carboxylic acid is a C1-C3 alkyl ester of C2-C3 carboxylic acid or is a C2-C3 alkyl ester of C1-C3 carboxylic acid.

Clause 4. The inkjet ink composition of any one of clauses 1 to 3, wherein the C1-C3 alkyl ester of C1-C3 carboxylic acid is from about 10% to about 65% by weight of the ink composition.

Clause 5. The inkjet ink composition of any one of clauses 1 to 4, wherein the C2-C3 alkyl alcohol if present is from about 1% to about 40% by weight of the ink composition.

Clause 6. The inkjet ink composition of any one of clauses 1 to 5, wherein the C3-C7 ketone is from about 5% to about 60% by weight of the ink composition.

Clause 7. The inkjet ink composition of any one of clauses 1 to 6, wherein the C1-C3 alkyl ester of C1-C3 carboxylic acid is selected from the group consisting of methyl acetate (MeOAc), ethyl acetate (EtOAc), isopropyl acetate (iPrOAc), n-propyl acetate (nPrOAc), and mixtures thereof.

Clause 8. The inkjet ink composition of any one of clauses 1 to 7, wherein the C1-C3 alkyl ester of C1-C3 carboxylic acid is selected from the group consisting of EtOAc, iPrOAc, and mixtures thereof.

Clause 9. The inkjet ink composition of any one of clauses 1 to 8, wherein the C2-C3 alkyl alcohol if present is selected from the group consisting of ethanol (EtOH), n-propanol (nPiOH), isopropanol (iPrOH), and mixtures thereof.

Clause 10. The inkjet ink composition of any one of clauses 1 to 9, wherein the C3-C7 ketone is selected from the group consisting of acetone, methyl ethyl ketone (MEK), diethyl ketone (DEK), methyl isopropyl ketone (MIPK), methyl n-propyl ketone (MPK), methyl isobutyl ketone (MIBK), methyl n-amyl ketone (MAK), methyl isoamyl ketone (MIAK), cyclopentanone, cyclohexanone, and mixtures thereof.

Clause 11. The inkjet ink composition of any one of clauses 1 to 10, wherein the C3-C7 ketone is selected from the group consisting of acetone, DEK, MIPK, MPK, and mixtures thereof.

Clause 12. The inkjet ink composition of any one of clauses 1 to 11, wherein if water is present, it is present at less than 5% by weight of the ink composition.

Clause 13. The inkjet ink composition of any one of clauses 1 to 12, wherein the binder resin is present at from about 1% to about 25% by weight of the ink composition.

Clause 14. The inkjet ink composition of any one of clauses 1 to 13, wherein the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins, and mixtures thereof.

Clause 15. The inkjet ink composition of any one of clauses 1 to 14, wherein the colorant is present at from about 1% to about 15% by weight of the ink composition.

Clause 16. The inkjet ink composition of any one of clauses 1 to 15, wherein the colorant is a conductive solvent soluble dye, or a mixture of conductive solvent soluble dyes.

Clause 17. The inkjet ink composition of any one of clauses 1 to 16, wherein the colorant is selected from C.I. Solvent Black 29, C.I. Solvent Black 27, C.I. Solvent Red 122, and combinations thereof.

Clause 18. The inkjet ink composition of any one of clauses 1 to 17, wherein the calculated evaporation rate for the solvent mixture is between about 2.0 and 4.0 based on individual published empirical values relative to n-butyl acetate.

Clause 19. The inkjet ink composition of any one of clauses 1 to 18, wherein the dry time of a printed mark on nonporous material is less than 5 seconds.

Clause 20. The inkjet ink composition of any one of clauses 1 to 19, wherein the ink is formulated for continuous inkjet printing.

Clause 21. The inkjet ink composition of any one of clauses 1 to 20, wherein the bulk ink resistivity of the inkjet ink composition is 1800 Ohm-cm or lower at 25° C.

Clause 22. The inkjet ink composition of any one of clauses 1 to 21, wherein the evaporation rate of the ink composition is no more than 30 mg per minute.

Clause 23. An inkjet ink composition comprising:

a) a binder resin;

b) a colorant; and c) a solvent mixture containing:

1) EtOAc or iPrOAc;

2) acetone, DEK, MIPK, or MPK, and

3) EtOH, nPiOH, or iPrOH, wherein the ink composition does not contain detectable MEK.

Clause 24. An inkjet ink composition comprising:

a) a binder resin;

b) a colorant; and c) a solvent mixture containing:

1) a C2-C3 alkyl ester of C1-C3 carboxylic acid;

2) a C2-C3 alkyl alcohol; and 3) a C3-C7 ketone.

Clause 25. The inkjet ink composition of clause 24, which does not contain methyl ethyl ketone.

Clause 26. The inkjet ink composition of clause 24, wherein the C2-C3 alkyl ester of a C1-C3 carboxylic acid is from about 10% to about 60% by weight of the ink composition.

Clause 27. The inkjet ink composition of clause 24, wherein the C2-C3 alkyl alcohol is from about 10% to about 60% by weight of the ink composition.

Clause 28. The inkjet ink composition of clause 24, wherein the C3-C7 ketone is from about 5% to about 50% by weight of the ink composition.

Clause 29. The inkjet ink composition of clause 26, wherein the C2-C3 alkyl ester of C1-C3 carboxylic acid is selected from the group consisting of methyl acetate (MeOAc), ethyl acetate (EtOAc), isopropyl acetate (iPrOAc), and n-propyl acetate (nPrOAc).

Clause 30. The inkjet ink composition of clause 29, wherein the C2-C3 alkyl ester of C1-C3 carboxylic acid is selected from the group consisting of EtOAc and iPrOAc.

Clause 31. The inkjet ink composition of clause 27, wherein the C2-C3 alkyl alcohol is selected from the group consisting of ethanol (EtOH), n-propanol (nPiOH) and isopropanol (iPrOH).

Clause 32. The inkjet ink composition of clause 28, wherein the C3-C7 ketone is selected from the group consisting of acetone, methyl ethyl ketone (MEK), diethyl ketone (DEK), methyl isopropyl ketone (MIPK), methyl n-propyl ketone (MPK), methyl isobutyl ketone (MIBK), methyl n-amyl ketone (MAK), methyl isoamyl ketone (MIAK), cyclopentanone, and cyclohexanone.

Clause 33. The inkjet ink composition of clause 32, wherein the C3-C7 ketone is selected from the group consisting of acetone, DEK, MIPK, and MPK.

Clause 34. The inkjet ink composition of clause 24, wherein if water is present, it is present at less than 5% by weight of the ink composition.

Clause 35. The inkjet ink composition of clause 24, wherein the binder resin is present at from about 1% to about 25% by weight of the ink composition.

Clause 36. The inkjet ink composition of clause 35, wherein the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins.

Clause 37. The inkjet ink composition of clause 24, wherein the colorant is present at from about 1% to about 15% by weight of the ink composition.

Clause 38. The inkjet ink composition of clause 24, wherein the calculated evaporation rate for the solvent mixture is between about 2.0 and 4.0 based on individual published empirical values relative to n-butyl acetate.

Clause 39. The inkjet ink composition of clause 24, wherein the dry time of a printed mark on nonporous material is less than 5 seconds.

Clause 40. The inkjet ink composition of clause 24, wherein the ink is formulated for continuous inkjet printing.

Clause 41. The inkjet ink composition of clause 24, wherein the bulk ink resistivity of the inkjet ink composition is 1800 Ohm-cm or lower at 25° C.

Clause 42. The inkjet ink composition of clause 24, wherein the evaporation rate of the ink composition is no more than 30 mg per minute.

Clause 43. An inkjet ink composition comprising:

a) a binder resin;

b) a colorant; and c) a solvent mixture containing:

1) a C1-C3 alkyl esters of C2-C3 carboxylic acid;

2) a C2-C3 alcohol; and 3) a C3-C7 ketone.

Clause 44. The inkjet ink composition of clause 43, which does not contain methyl ethyl ketone.

Clause 45. The inkjet ink composition of clause 43, wherein the C1-C3 alkyl esters of C2-C3 carboxylic acid is from about 10% to about 60% by weight of the ink composition.

Clause 46. The inkjet ink composition of clause 43, wherein the C2-C3 alkyl alcohol is from about 10% to about 60% by weight of the ink composition.

Clause 47. The inkjet ink composition of clause 43, wherein the C3-C7 ketone is from about 5% to about 50% by weight of the ink composition.

Clause 48. The inkjet ink composition of clause 45, wherein the C1-C3 alkyl esters of C2-C3 carboxylic acid is selected from the group consisting of methyl acetate (MeOAc), ethyl acetate (EtOAc), isopropyl acetate (iPrOAc), and n-propyl acetate (nPrOAc).

Clause 49. The inkjet ink composition of clause 48, wherein the C1-C3 alkyl esters of C2-C3 carboxylic acid is selected from the group consisting of EtOAc and iPrOAc.

Clause 50. The inkjet ink composition of clause 46, wherein the C2-C3 alkyl alcohol is selected from the group consisting of ethanol (EtOH), n-propanol (nPiOH) and isopropanol (iPrOH).

Clause 51. The inkjet ink composition of clause 47, wherein the C3-C7 ketone is selected from the group consisting of acetone, methyl ethyl ketone (MEK), diethyl ketone (DEK), methyl isopropyl ketone (MIPK), methyl n-propyl ketone (MPK), methyl isobutyl ketone (MIBK), methyl n-amyl ketone (MAK), methyl isoamyl ketone (MIAK), cyclopentanone, and cyclohexanone.

Clause 52. The inkjet ink composition of clause 51, wherein the C3-C7 ketone is selected from the group consisting of acetone, DEK, MIPK, and MPK.

Clause 53. The inkjet ink composition of clause 43, wherein if water is present, it is present at less than 5% by weight of the ink composition.

Clause 54. The inkjet ink composition of clause 43, wherein the binder resin is present at from about 1% to about 25% by weight of the ink composition.

Clause 55. The inkjet ink composition of clause 54, wherein the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins.

Clause 56. The inkjet ink composition of clause 43, wherein the colorant is present at from about 1% to about 15% by weight of the ink composition.

Clause 57. The inkjet ink composition of clause 43, wherein the calculated evaporation rate for the solvent mixture is between about 2.0 and 4.0 based on individual published empirical values relative to n-butyl acetate.

Clause 58. The inkjet ink composition of clause 43, wherein the dry time of a printed mark on nonporous material is less than 5 seconds.

Clause 59. The inkjet ink composition of clause 43, wherein the ink is formulated for continuous inkjet printing.

Clause 60. The inkjet ink composition of clause 43, wherein the bulk ink resistivity of the inkjet ink composition is 1800 Ohm-cm or lower at 25° C.

Clause 61. The inkjet ink composition of clause 43, wherein the evaporation rate of the ink composition is no more than 30 mg per minute.

The invention claimed is:

1. An inkjet ink composition comprising:
a) a binder resin;
b) a colorant; and
c) a solvent mixture containing:
1) about 10% to about 65% by weight of a C1-C3 alkyl ester of C1-C3 carboxylic acid selected from the group consisting of methyl acetate (MeOAc), ethyl acetate (EtOAc), isopropyl acetate (iPrOAc), and n-propyl acetate (nPrOAc);
2) about 5% to about 60% by weight of a C3-C7 ketone selected from the group consisting of acetone, methyl ethyl ketone (MEK), diethyl ketone (DEK), methyl isopropyl ketone (MIPK), methyl n-propyl ketone (MPK), methyl isobutyl ketone (MIBK methyl n-amyl ketone (MAK), methyl isoamyl ketone (MIAK), cyclopentanone, and cyclohexanone; and
3) optionally, about 1% to about 40% by weight of a C2-C3 alkyl alcohol selected from the group consisting of ethanol (EtOH), n-propanol (nPrOH) and isopropanol iPrOH), wherein the ink composition does not contain a humectant.

2. The inkjet ink composition of claim 1, wherein the C1-C3 alkyl ester of C1-C3 carboxylic acid is selected from the group consisting of EtOAc and iPrOAc.

3. The inkjet ink composition of claim 1, wherein the C2-C3 alkyl alcohol is selected from the group consisting of ethanol (EtOH), n-propanol (nPrOH) and isopropanol (iPrOH).

4. The inkjet ink composition of claim 1, wherein the C3-C7 ketone is selected from the group consisting of acetone, DEK, MIPK, and MPK.

5. The inkjet ink composition of claim 1, wherein if water is present, it is present at less than 5% by weight of the ink composition.

6. The inkjet ink composition of claim 1, wherein the binder resin is present at from about 1% to about 25% by weight of the ink composition.

7. The inkjet ink composition of claim 6, wherein the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins.

8. The inkjet ink composition of claim 1, wherein the colorant is present at from about 1% to about 15% by weight of the ink composition.

9. The inkjet ink composition of claim 1, wherein the colorant is a conductive solvent soluble dye, or a mixture of conductive solvent soluble dyes.

10. The inkjet ink composition of claim 1, wherein the colorant is selected from C.I. Solvent Black 29, C.I. Solvent Black 27, C.I. Solvent Red 122, and combinations thereof.

11. The inkjet ink composition of claim 1, wherein the calculated evaporation rate for the solvent mixture is between about 2.0 and 4.0 based on individual published empirical values relative to n-butyl acetate.

12. The inkjet ink composition of claim 1, wherein the dry time of a printed mark on nonporous material is less than 5 seconds.

13. The inkjet ink composition of claim 1, wherein the ink is formulated for continuous inkjet printing.

14. The inkjet ink composition of claim 1, wherein the bulk ink resistivity of the inkjet ink composition is 1800 Ohm-cm or lower at 25° C.

15. The inkjet ink composition of claim 1, wherein the evaporation rate of the ink composition is no more than 30 mg per minute, as determined by placing approximately 5 g of the ink in a 5.1 cm diameter aluminum pan on an enclosed analytical balance, recording weight loss every two minutes over a 20-minute period, and calculating the evaporation rate from the weight loss versus time at approximately 20° C.

16. An inkjet ink composition comprising:

a) a binder resin;

b) a colorant; and c) a solvent mixture containing:

1) about 10% to about 65% by weight of EtOAc or iPrOAc;

2) about 5% to about 60% by weight of acetone, DEK, MIPK, or MPK, and 3) optionally, about 1% to about 40% by weight of EtOH, nPrOH, or iPrOH wherein the ink composition does not contain detectable MEK and wherein the ink composition does not contain a humectant.

17. The inkjet ink composition of claim 16, wherein the binder resin is present at from about 1% to about 25% by weight of the ink composition.

18. The inkjet ink composition of claim 17, wherein the binder resin is selected from the group consisting of acrylic resins, styrene acrylic resins, silicon resins, polyesters, polyurethane resins, polyamide, styrene-allyl alcohol resins, vinyl resins, nitrocellulose, cellulose esters, cellulose ethers, aldehyde resins, ketone resins, epoxy resin, rosin esters, hydrocarbon resins, phenolic resins, poly(hydroxystyrene) resin, terpene phenolic resins.

19. The inkjet ink composition of claim 16, wherein the colorant is present at from about 1% to about 15% by weight of the ink composition.

20. The inkjet ink composition of claim 16, wherein the colorant is a conductive solvent soluble dye, or a mixture of conductive solvent soluble dyes.

* * * * *